United States Patent [19]
Hayashi et al.

[11] 4,224,348
[45] Sep. 23, 1980

[54] PROCESS FOR IMPROVING THE PROPERTIES OF GELATIN

[75] Inventors: Kenji Hayashi, Ibaraki; Mitsuo Washizawa, Osaka; Shuji Yokoo, Ibaraki, all of Japan

[73] Assignee: Kyowa Hakko Kogyo Kabushiki Kaisha, Tokyo, Japan

[21] Appl. No.: 26,483

[22] Filed: Apr. 2, 1979

Related U.S. Application Data

[63] Continuation-in-part of Ser. No. 845,088, Oct. 25, 1977, abandoned.

[30] Foreign Application Priority Data

Oct. 28, 1976 [JP] Japan .................. 51-129700

[51] Int. Cl.² .......................... A23J 3/00; A23L 1/04
[52] U.S. Cl. .................................. 426/234; 426/242; 426/576; 426/241
[58] Field of Search .............. 426/242, 576, 234, 241

[56] References Cited

U.S. PATENT DOCUMENTS

| | | | |
|---|---|---|---|
| 2,841,498 | 7/1958 | Cahn | 426/576 |
| 2,948,622 | 8/1960 | Cahn | 426/576 |
| 3,332,782 | 7/1967 | Wingerd | 426/576 |

*Primary Examiner*—Jeanette M. Hunter
*Attorney, Agent, or Firm*—Wolder, Gross & Yavner

[57] ABSTRACT

Improving the cold water soluble properties of gelatin, in which a raw gelatin having a water content of more than 8% by weight is subjected to microwave heating using microwave energy to remove at least 35% of said water content to obtain a treated gelatin having a water content of not more than 16% by weight. The thus-obtained gelatin exhibits improved solubility in cold water. If desired, an expanding agent may be added to the raw gelatin before the microwave heating, thereby it is possible to obtain a treated gelatin having better transparency and outlook.

17 Claims, No Drawings

PROCESS FOR IMPROVING THE PROPERTIES OF GELATIN

RELATED APPLICATION

The present application is a continuation-in-part of Ser. No. 845,088, filed Oct. 25, 1977, now abandoned in the name of the present inventors.

SUMMARY OF THE INVENTION

The present invention relates to a process for improving the properties of gelatin. As is well known, gelatin is a type of protein derived from collagen and is widely used, for example, as a raw material for foodstuffs such as confectionary, medicaments, photographic emulsions, adhesives and the like. Gelatin is used in the form of aqueous solution. However, it is not readily soluble in cold water, and thus gelatin solution is prepared, for example, by immersing a gelatin in cold water with agitation at room temperature so that the gelatin is swelled, and then either heating the mixture to 50° C. or continuing the agitation at room temperature for 24 hours. However, such an operation is time-consuming. The art has long sought a process for improving the solubility of gelatin in water at a temperature lower than room temperature. As used in this specification, the term water-solubility of gelatin denotes the cold water-solubility as hereinbefore defined.

PRIOR ART

It is known to make gelatin completely water-soluble by drying a gelatin at 100° C. under reduced pressure (U.S. Pat. No. 2,803,548). However, the gelatin thus-obtained is incapable of being gelled. There is thus a need to improve the water-solubility of gelatin without feleterious influence upon other properties of gelatin such as gelling ability, and the outlook and stability of the gel. Various attempts have been made to serve this purpose. However, such prior art processes have significant disadvantages. For example, it is known to improve the properties of gelatin by freeze-drying a gelatin dissolved in water at a concentration of 0.1-2% by weight under reduced pressure (U.S. Pat. No. 2,166,074). However, this process requires a conventional dissolving method for the preparation of the gelatin solution used as the starting material, and also the low concentration of the gelatin in the solution makes this process expensive. U.S. Pat. No. 3,514,516 describes a process for improving the properties of gelatin, in which a gelatin, having a water content of not more than 10% by weight, is frozen at a low temperature, the freeze-drying of the gelatin being started at about 100° C. and the temperature gradually lowered to about 40° C. This patent describes that the resultant gelatin is stable at 125° C. for one hour and that the gel derived from this gelatin is stable at a temperature above 35° C., in contrast to gels derived from conventionally improved gelatins. However, this process requires prior adjustment of the water content of the starting gelatin (gelatins of market grade usually contain more than 10% by weight of water), and is also complicated and expensive.

On the other hand, various proposals have been put forward to improve the water-solubility of gelatin without exerting deleterious influence upon other properties, which involve the addition of sugar to gelatin. For example, according to U.S. Pat. No. 2,803,548, a gelatin is dispersed in water containing sugar in an amount of not more than 10 times by weight of the gelatin added, and the gelatin is dissolved by heating the dispersion. A solid material is obtained by evaporating off water under reduced pressure. This solid is capable of being dissolved in cold water at room temperature and forms a gel. However, as the strength of the gel prepared from the untreated raw gelatin is higher than that prepared from the treated gelatin by 10%, it is necessary to use a larger amount of the treated gelatin by 10% more. According to U.S. Pat. No. 2,641,498, a 40% (by weight) aqueous solution containing sugar and gelatin (10-8 and one part by weight respectively) is spray-dried at 124°-243° C. to give powders containing 4-5% by weight of water. By dissolving the powders in cold water, a mixed solution of gelatin and sugar is easily obtained, this gelatin having analogous properties to those of untreated gelatin. However, it is only possible by this process to obtain a gelatin having improved water-solubility in the form of a mixture of gelatin and sugar. Furthermore, other properties, for example, the gel strength of the gelatin thus-obtained are not superior to those of untreated gelatin. U.S. Pat. No. 3,930,053 discloses that the water-solubility of a spray-dried, funnel dried or drum dried gelatin in association with a powdered cosmetible component, the use of controlled sizes and proportions of gelatin and cosmetible component being specified. This gelatin has also the similar disadvantages to those described above.

SUMMARY OF INVENTION

The present invention teaches the production of a gelatin which is capable of being dissolved in cold water in simple manner and with quicker speed by the use of a process involving microwave heating of water-containing gelatin.

Thus the present invention provides a process for improving the water-solubility of gelatin, which comprises subjecting a gelatin, having a water content of more than 8% by weight based on the total weight of the gelatin and water, to microwave heating to remove at least 35% of said water content to obtain a treated gelatin having a water content of not more than 16% by weight based on the total weight of the gelatin and water.

When an aqueous solution of the treated gelatin of the present invention is prepared, the use of the gelatin in grnular or powder form is preferable. When the gelatin is in the form of a fine powder, it is dissolved more quickly by dividing the gelatin into small fractions and feeding these fractions stepwise in water. For the purpose of preparing confectionary, for example, gelatin is usually used in association with sugar. In such cases, gelatin is often dispersed in sugar, followed by dissolution in water. When the gelatin treated according to the present invention is dispersed in sugar, it is possible to add at one time the total amount of the gelatin and sugar to a desired amount of water, or vice versa. In this manner, the gelatin may be dissolved quickly. Other edible dispersants than sugar which may be used for this purpose are exemplified by sweatening agents (e.g. glucose), taste-enhancing agents (e.g. sodium glutamate, nucleic acids and succinic acid) and sodium chloride. In these cases, the amount of the dispersant used is preferably at a ratio of 1-30:1% by weight of the gelatin (dry basis). If desired, it is possible to add such a dispersant to the raw gelatin before microwave heating according to the present invention, and the amount of the dispersant added is preferably approximately 10% by weight of the raw gelatin (dry basis).

As apparent from the following experimental results, the properties of the jellies prepared from the water-soluble gelatin of the present invention are identical with those of the jellies obtained by using untreated gelatin. Accordingly, the water-soluble gelatin obtained by the process of the present invention may be used in an analogous manner to to that of conventional gelatin.

The present invention is believed related to improving the water-solubility of gelatin when the voids in the micelle structure of water-containing gelatin are expanded and fixed in the expanded state.

The process of the present invention will be fully and clearly described in the following specification where the following terms are used:

Definition of Terms

Raw Gelatin

A gelatin to be treated with microwave heating according to the process of the present invention viz. untreated gelatin.

Improved Gelatin

A gelatin, of which properties such as water-solubility, have been improved by known processes, for example, spray-drying, freeze-drying and the like.

Treated Gelatin

A gelatin obtained by subjecting the raw gelatin to microwave heating according to the process of the present invention.

All known gelatins produced by treating collagen, for example, with acid, alkali and enzyme may be used as starting material for the process of the present invention. It is also possible to use raw gelatin which may contain impurities (e.g. glue) to a greater or lesser extent if the gelatin contains more than 8% by weight of water based on the total weight of the raw gelatin including water and impurities. For the purpose of the present invention, it is not necessary to add any known additive (for example, sugar) to the raw gelatin. The raw gelatin may be used in the form of a sheet, granules or powders (in the case of dry gelatin) and in the form of a gel or sol containing a large amount of water (in the case of wet gelatin). Accordingly, when a dry gelatin is used, it is possible to swell it by water-adsorption or by dissolving it in water before use, while it is also possible to use a material containing a very large amount of water, which is directed to be used for the preparation of dry gelatin.

The water content of a raw gelatin according to the present invention is more than 8% by weight on the basis of the raw gelatin including water and impurities. However, with reference to the following Experiment No. 1, it is necessary in some cases to be more than 10% by weight. On the other hand, the upper limit of the water content is believed to be dependent only upon the practical applicability and economy of the process of the present invention. This is true since it is possible to improve the water-solubility and to obtain good gelling ability even when a gelatin containing a very large amount of water (e.g. more than 50% by weight) is used as the raw gelatin. Of course, it is not advantageous for practical purposes to use a raw gelatin containing an excessively large amount of water, which may require a very large amount of electric power for removal of water contained in the raw gelatin. In such a case, it is possible, if desired, to pre-treat the raw gelatin before microwave heating to give a suitable water content, for example, by drying the same in sun light or hot air. On the contrary, it is also possible to increase the water content of the raw gelatin before microwave heating by water-adsorption.

Especially good results may be obtained when the water content of raw gelatin is 10–55% by weight. According to JIS (Japanese Industrial Standard), the water content of commercial grade gelatins is not more than 16% by weight based on the total weight of the gelatin and water, and many of market grade gelatins usually contain water in an amount of about 10–13% by weight. Thus, the present invention is particularly advantageous since there is no need of pretreating such a raw gelatin.

The raw gelatin is usually subjected to microwave heating without an additive. The use of microwave within a range of 30 to 30,000 MHz (for example, 915 and 2450 MHz) for heating and dehydrating water-containing materials such as for example, foodstuffs and the like is known per se, as is disclosed, for example, in "Microwave Heating of Foodstuffs" (1974), published in Tokyo in Japanese version, which is hereby cited as reference.

For using the electric energy effectively, it is preferred to enclose the raw gelatin, for example, in a vessel made of polytetrafluoroethylene, glass wool, kraft paper and the like or with sheets and films thereof, or to use these materials as a heat-insulator. These materials are preferably provided with small holes in such cases. In order to use the heat effectively, a pile of raw gelatin with a thickness of around 0.2 mm is preferable. It is also a good idea to use a microwave oven provided with a belt conveyor for transporting raw gelatin across the oven during microwave heating.

The amount of electric energy for microwave heating and the period of time for microwave heating depend upon various factors, such as for example, the amount of water to be removed from the raw gelatin, the amount of raw gelatin to be treated and so on. While the degree of water removed from raw gelatin defines the period of microwave haeting, it generally takes from 30 seconds to 30 minutes.

Usually, microwave heating may be effected continuously. However, when raw gelatin is treated for a long time (e.g. 20 minutes or more), it is possible to continuously effect microwave irradiation, followed by intermittent irradiation. The temperature of raw gelatin before the irradiation is not critical, and it is thus possible to pre-heat the raw gelatin before microwave heating. However, over-heating should be avoided, since this can deleteriously influence the properties of the treated gelatin. In the following experiments, the microwave ovens used had an output of not more than 2.2 kW at 915 or 2450 MHz, the irradiation times were in general within 20 minutes, and the temperature of the gelatins during microwave heating was believed to be raised to about 80°–105° C.

As long as more than 35% by weight of the water contained in the raw gelatin is removed by microwave heating, the lower limit of the water content in the treated gelatin is not critical. However, from a practical viewpoint, this lower limit would be about 5% by weight because it has been observed that the water-solubility of the treated gelatin is liable to decrease when the treatment is continued further. It is advantageous to dry the treated gelatin, for example, in sun light or hot air when it is desired to obtain a lower water content in the treated gelatin. On the other hand, it is also possible to increase the water content of the treated gelatin by water-adsorption. In all events, the gelling ability and water-solubility of the treated gelatin are not significantly changed thereby.

Various advantages obtained by the process of the present invention are exemplified as follows:

It is not necessary to use an additive (e.g. sugar) together with the raw gelatin and furthermore the raw gelatin may, if desired, contain impurities (e.g. glue) to a greater or lesser extent. Special pretreatment of the raw gelatin is, in general, not required. The lower limit of the water content of the raw gelatin required ensures that the conventional dry gelatins of market grade may be used without pretreatment. On the other hand, the upper limit of the water content depends upon the practical applicability and economy. Furthermore, it is also possible to adjust the water content of the raw gelatin prior to microwave heating, if desired, and also it is possible to use as raw gelatin a wet material containing a very large amount of water for the preparation of dry gelatin, if desired, in a through-put process. On the contrary, it is believed that it is difficult to select the raw material as freely and widely in known processes as is the case with the process of the present invention. The process of the present invention may be carried out simply and cheaply because the only requirements relate to the amounts of water contained in the raw and treated gelatins and to the amount of water to be removed from the raw gelatin. The water-solubility of the treated gelatin is improved, while other properties such as the gelling ability and outlook are retained. The mode of the use of the treated gelatin is not limited, while the stability and strength of the gel formed from the treated gelatin are substantially unchanged, irrespective of the presence or absence of additive.

It is sometimes required to produce a gelatin jelly having excellent transparency and outlook. For this purpose, the present invention teaches that the raw gelatin is subjected to microwave heating, in association with an expanding agent.

The term expanding agent used herein denotes edible expanding agents which are well known in the art, for example, sodium carbonate, ammonium hydrogen carbonate and the like, which may be used, for example, for baking powder. The amount of the expanding agent to be added is preferably about 0.1–5% by weight of the raw gelain (dry basis). It is possible to dissolve an expanding agent in water, in which the raw gelatin is then dissolved, or vice versa. If desired, an expanding agent in the form of solid or liquid may be added to the raw gelatin in gel or sol form, followed by sufficient agitation. However, the transparency and outlook of the treated gelatin can not be improved by adding an expanding agent to the gelatin after microwave heating.

The strength and stability of the gelatin gel is not substantially changed by using the expanding agent of the present invention. When a gelatin treated after addition of expanding agent is compared with another gelatin treated without addition of the same, there is no difference with respect to Solubility Index (A) and jelly strength and the like (as hereinafter defined). However, when two types of gelatin jelly are compared with each other with respect to the taste, appetizing feeling, outlook etc., the former, that is to say, a gelatin which is treated after addition of the expanding agent is superior to the latter with respect to the outlook.

On the other hand, jellies were prepared from a gelatin treated after addition of an expanding agent and from a raw gelatin respectively and compared with each other with respect to the taste, appetizing feeling and it was observed that there was no difference of the taste and appetizing feeling and the difference in the outlook was almost negligible. These comparisons were effected by using gelatin powders of not more than 250 meshes.

In another embodiment, an edible dispersing agent may be present during the microwave heating to improve cold water solubility. As used in the specification and claims, the term "edible dispersing agent" denotes the materials denoted in U.S. Pat. No. 2,834,683 as "solubilizing agent", exemplified by taste enhancing-agent, glucose, sugar, maltose, artificial and natural sweetening agents, citric acid, gluconic acid, "Schardinger dextrins", sorbital and the like. Said U.S. Pat. No. 2,834,683 is incorporated by reference.

Various experiments were effected to show the properties of the treated gelatin and the results are indicated in the following tables and description, in which the weight of gelatin is indicated on a dry basis, otherwise specified, and the terms raw gelatin and treated gelatin are as hereinbefore defined.

In the following Tables 1–4, Test Nos. 4–13, 17–23, 31–37 and 42–48 indicate the results of tests on gelatins treated by the process of the present invention. Test Nos. 1–3, 16 and 26–28 indicate the results of tests on gelatins which have been treated, but not in accordance with the process of the present invention. Test Nos. 14, 15, 29, 30, 38–41 and 49–52 indicate the results of tests on raw (untreated) gelatins. In Table 5, the controls are indicated.

Experiment I

Table 1 indicates (1) Test No., (2) Water content in raw gelatin (%), (3) Time of microwave heating (second), (4) Water content in treated gelatin (%), (5) Amount of gelatin dissolved in water (mg/ml), (6) Solubility Index (A) (%) as hereinafter defined, (7) Jelly strength (g) and (8) Solubility Index (B) (%) as hereinafter defined.

The experiment was carried out in the following manner.

(1) Determination of the amounts of gelatin dissolved in water (I) and (II) and Solubility Index (A)

A raw gelatin (weight 100 g on wet basis) containing a known water content and having a jelly strength of 30 Bloom was powdered to a corn grade of not more than 80 mesh and was enclosed in a sheet of polytetrafluoroethylene having a thickness of 0.1 mm. The powders were put in a beaker made of glss (capacity 2,000 ml) and were treated with microwave for a pre-determined time by using a microwave oven (output 400 W at 2450 MHz). The gelatin treated was powdered, and the powders of not more than 80 mesh (weight 4 g) were well mixed with sugar (12 g). The mixture was then added at once to water having a temperature of 20° C. (100 ml) and was kept at 20° C. for 3 minutes with agitation, resulting in an aqueous solution containing gelatin and sugar, which was filtered by using a double-folded gauze to give a filtrate. The total nitrogen in the filtrate was determined by the micro-Kjeldahl method, from which the amount (I) (mg/ml) of the gelatin dissolved in water was determined. Separately, a corresponding raw gelatin (4 g) without addition of sugar was treated in a similar manner to that described above to give an aqueous dispersion containing gelatin, which was heated to 50° C. in 15–20 minutes. By keeping the dispersion at about 50° C. for 5 minutes, the gelatin was completely dissolved. Its total nitrogen content was determined in a similar manner to that described above, from which the amount (II) (mg/ml) of the gelatin dissolved in water was determined. It was evaluated tht a larger Solubility Index (A) indicated by the following formula showed a larger relative amount of gelatin dissolved in water at 20° C. within 3 minutes viz. a higher water-solubility:

Solubility Index (A)=[amount of gelatin dissolved in water (I) (mg/ml)/amount of gelatin dissolved in water (II) (mg/ml)]×100%.

(2) Determination of jelly strength (I), jelly strength (II) and Solubility Index (B)

An aqueous solution of a treated gelatin (4 g) and sugar (12 g) was prepared in a similar manner to that used to determine the amount of gelatin dissolved in water (I), the gelatin containing a predetermined amount of water correspondingly. Foams were removed from the solution without filtration. After this, the solution was put in a jelly cup having a given capacity and was allowed to stand at 17° C. for 18 hours to form a jelly. Reometer Type R-UDJ (commercial product of Fuji Riko Kogyo K.K., Japan) was used to determine jelly strength (I) at a room temperature of 20° C. and a jelly temperature of 7° C. Separately, the same raw gelatin (4 g) was treated in a similar manner to that used to determine the amount of gelatin dissolved in water (II) with the exception that sugar (12 g) was added to obtain an aqueous solution containing a completely dissolved gelatin. This solution was used to prepare a jelly in a similar manner to that used for the determination of jelly strength (I) (g), from which jelly strength (II) (g) was determined.

When the concentration of the gelatin solution was excessively high, it was difficult to filter the solution and accordingly the amount of gelatin dissolved in water and also Solubility Index could hardly be determined. However, it can be said that a larger amount of gelatin dissolved in water is liable to give a higher jelly strength. When the amount of gelatin dissolved in water could not be measured, it was evaluated that a lerger Solubility Index (B) indicated by the following formula corresponded to a relatively larger amount of gelatin dissolved in water viz. a better water-solubility:

Solubility Index (B)=[jelly strength (I)/jelly strength (II)]×100%.

It is noted that jellies used for foodstuffs of market grade preferably have a range of jelly strength of from several grams to about 20 grams.

When a gelatin used to determine Solubility Index (B) was not completely dissolved in water and the determination was difficult, the column indicating "jelly strength" in the tables was filled with the terms of "swelled" or "swelled and solidified".

(3) In Table 1, Test Nos. 4–13 indicate the data on gelatins treated by the process of the present invention, and Nos. 1–3 indicate comparative results. The data shown in No. 14 were obtained by using a raw gelatin (4 g) containing water (15.3%). This gelatin was mixed with sugar (12 g) and determined in a similar manner to that used to determine the amount of gelatin (I) dissolved in water. The results shown in No. 14 include the amount of gelatin (I) dissolved in water (2.49 mg/ml) and Solubility Index (A) (41.1%). The results in No. 15 were obtained by using a similar mixture of gelatin and sugar to that used in No. 14. and the amount of gelatin (II) dissolved in water was determined in a similar manner to that used to determine Solubility Index (II) as set forth. In No. 15, the amount of gelatin (II) dissolved in water is conveniently indicated in the column of the amount of gelatin (I) dissolved in water. Because the gelatin shown in No. 15 is a control gelatin, its Solubility Index (A) and (B) are 100%. It is noted that the amount (I) of gelatin dissolved in water jelly strength (I) are variable, depending upon the treating conditions, while the corresponding values of raw gelatin are independent upon the water content.

(4) In Test Nos. 4–13, the data were obtained by using gelatins treated by the process of the present invention. Each sample was dissolved in water at 20° C. for 3 minutes. The amount of gelatin (I) dissolved in water was more than the corresponding amount (I) obtained by using a corresponding raw gelatin (2.49 mg/ml).

(5) A raw gelatin was mixed with sugar and dissolved in water at 20° C. for 3 minutes to give a gelatin solution which was then used, without being filtered, to form a jelly. However, good result was not obtained in Test No. 14. On the other hand, in Test Nos. 4–13, gelatins were treated by the process of the present invention and used to form jellies in a similar manner to that used in Test No. 14, and good results were obtained except No. 5. It was thus confirmed that gelatins treated by the process of the present invention were afforded with improved gelling ability. Particularly in Test Nos. 8, 9 and 10, each jelly obtained had a strength which was at least equal to the strength of a jelly (40 g in No. 15) formed by dissolving completely a raw gelatin added with the same amount of sugar, in water. Although the jelly strength of No. 15 was obtained from a raw gelatin added with sugar, the gel strength was not markedly changed by addition of sugar. It is thus concluded that the ability to form a gel and the jelly strength obtained from the gelatin treated by the process of the present invention are equal to those of raw gelatin.

(6) In Table 1, Test No. 3 indicates that Solubility Index (A) is improved at an initial water content of approximately 8% by weight, as may be seen by comparison with Test No. 14, while jelly is first formed in No. 4 at an initial water content of 10.5%. Thus it may be concluded that cold water-solubility is improved at a lower limit of 8% (initial water content) while the lower water content limit is preferably 10% with respect to the formation of jellies.

Experiment II (with reference to Table 2)

(I) Table 2 shows the data obtained in a similar manner to that used to prepare Table 1 except a raw gelatin having a jelly strength of 250 Bloom was used. Test Nos. 16 and 26–30 indicate the experimental data, in which Nos. 29 and 30 are the control data and the remaining Nos. 17–23 represent the data on the gelatins treated by the process of the present invention.

The amount of gelatin dissolved in water was hardly determined except No. 17, in which the amount (I) was 1.88 mg/ml which was larger than the corresponding amount (I) shown in No. 29 (1.47 mg/ml). The latter was obtained by using a raw gelatin for control purpose. In Test Nos. 17 and 23, the gelatins used were not jellified. As almost all gelatins treated by the process of the present invention (Nos. 18-25) were jellified, it was confirmed that the amount of the treated gelatin dissolved in water at a given temperature in a given time was larger than the dissolved amount of the corresponding raw gelatin.

(2) In Test Nos. 19-25, it was difficult to determine the amount of gelatin participating in the formation of jelly. However, the jelly strength and Solubility Index (B) of each gelatin in Nos. 19-25 was substantially not distinguishable from the corresponding value of the control gelatin in No. 30. It may accordingly be concluded that the jelly strength and ability of forming a gel of the treated gelatin is almost equal to those of the corresponding raw gelatin.

(3) The results obtained from Nos. 1-5, 15, 17, 19-22, 25 and 27 in Experiments I and II indicate that, in order to improve water-solubility, it is necessary to remove more than 35% of the water content from the untreated gelatin and to ensure that the treated gelatin retains a water content of not more than 16% by weight.

(4) In Test No. 19, a gelatin (water content 26.5%) was continuously treated with microwave for 270 seconds and after this an interval of 30 seconds and an irradiation of 15 seconds were repeated (irradiation time 330 seconds in total) to avoid the "burning" of gelatin. The water content of the gelatin thus-treated was 0.9% (a minimum water content among the gelatins tested). On the other hand, in No. 23, a gelatin (water content 50.2%) was continuously treated with microwave radiation for 540 seconds to give a treated gelatin (water content 4.3%). These results were compared with other test results according to the process of the present invention to confirm that the operational conditions specified according to the present invention cover a very wide range and offer consistent results.

Experiment III (with reference to Table 3)

(1) A raw gelatin (water content 24%; corn grade 4-8 mesh; jelly strength 250 Bloom; weight 12 g) was subjected to microwave heating by using a microwave oven (output 2.2 kW at 2450 MHz) having therein a conveyor belt with a speed of 0.6 m/min to convey the gelatin continuously across a specified area (about 30 cm wide; and about 120 cm in length) at a ratio of 150 g/min. The raw gelatin was piled up on the belt to have a thickness of about 3-4 cm. The treated gelatin was taken out and powdered. The treated gelatin (weight 9.1 kg including a water content of 9.5%) was obtained in powder form (not more than 80 mesh). A given amount of the treated gelatin was dispersed in sugar (3 times amount of the gelatin) to give a sample. The thus-obtained samples were added at once to water (100 ml) at 30, 20, 15, 10 and 5° C. respectively and were kept at these temperatures for a given time with agitation. After this, foams were removed from the samples without being filtered. Each sample was put in a jelly cup having a given capacity and was left at 7° C. for 18 hours to make a jelly. When the samples were dissolved in water at 30° or 20° C., jellies were produced. When the samples were dissolved in water at a temperature of not higher than 10° C. they did not give jellies but merely swelled. When the samples were dissolved in water at 15° C. incomplete jellies were obtained including swollen fractions and the Solubility Index (B) was not measured.

On the other hand, when a corresponding raw gelatin was mixed with sugar (3 times amount of the gelatin), the mixture did not dissolve in water at a temperature not higher than 30° C. by treatment similar to that described above. Accordingly, the temperature was elevated to about 50° C. to dissolve the mixture completely and the jelly strength was measured in a similar manner to that described above, which was conveniently indicated in the column of "20° C." in Table 3.

From Table 3, it is apparent that when the treated gelatin of the present invention was dissolved in water at 30° and 20° C. for a given period of time respectively, their water-solubility and ability of gelling were equal or superior to those of the corresponding raw gelatin.

Experiment IV (with reference to Table 4):

(1) An alkali gelatin (corn grade 4-8 mesh; jelly strength 30 Bloom; water content 15%; weight 1 kg) was enclosed in a sheet (thickness 0.1 mm) of polytetrafluoroethylene and subjected to microwave heating for 300 seconds by using a microwave oven without a conveyor belt (output 2.2 kW at 2450 MHz), by which hot air (80° C.) was blown into the oven. A treated gelatin obtained contained 4.8% of water. The treated gelatin was powdered (not more than 80 mesh). In Table 4, Test Nos. 49-52 indicate the results of the raw gelatin. Nos. 42, 43-48 and 49-52 in Table 4 correspond respectively to Nos. 31, 32-37 and 38-41 in Table 3, and the determination was carried out in a similar manner to that used in Experiment III.

(2) The water-solubility was greatly improved when the jelly strength of the raw gelatin was low, and jellies were formed even when the samples were dissolved in water at 10° C. (Nos. 44-48). When the gelatin concentration was 0.5% and no sugar was added to the solution, the gelatin was completely dissolved (No. 42). On the contrary, the corresponding raw gelatin was swelled but hardly dissolved in water (No. 49).

When the treated gelatin was dissolved at a concentration of 2% for 3 minutes, it was completely dissolved in water at 30°-15° C. but did not form a jelly. The Solubility Index (B) also decreases according to the decreased temperature of water, and the gelatin was almost completely dissolved in water at 15° C.

When the treated gelatin was dissolved at a concentration of 4% for 5-10 minutes (Nos. 46-47), it was almost completely dissolved in water at 10° C. and its jelly strength was equal to the jelly strength of the corresponding raw gelatin (No. 51). The treated gelatin dissolved in water at 5° C. was not jellified except No. 48, in which the concentration of the gelatin used was 6% and the dissolving time was 6 minutes.

On the other hand, a raw gelatin was mixed with sugar (3 times amount of the gelatin). This mixture was treated in a similar manner to that described above, but was not dissolved in water at 30° C. Then the temperature was elevated to about 50° C. and the mixture was completely dissolved. This solution was treated in a similar manner to that described in Experiment I to determine the jelly strength which is conveniently indicated in the column of "20° C." in Table 4.

Tables 3 and 4 indicate that the treated gelatin of the present invention exhibits excellent water-solubility even at lower temperature, while the corresponding raw gelatin is swelled but not dissolved in water. In Tables 1-4, the blank columns indicate that the data could not be determined, unless otherwise specified.

Experiment V (1) The treated gelatins of Test Nos. 1-4, 8 and 11 (jelly strength 30 Bloom) and No. 21 (jelly strength 250

Bloom) were respectively powdered (not more than 80 mesh). Each of the samples thus-obtained was divided into fractions and dissolved in water at 25° C., the amount of respective fractions being determined so as to give concentrations of 2, 4 and 6% respectively. After the total amount of each fraction was simultaneously added to water, the water was agitated for 30 minutes. By way of contrast, each fraction was further divided into several factions of small amounts and was added to water in stepwise fashion. For control purpose, raw gelatins corresponding to these treated gelatins were also respectively dissolved in a similar manner to that described above.

(2) In the case of adding the whole amount of gelatin at one time to water, the treated gelatins of Nos. 1–3 were almost completely dissolved in water in 30 minutes. The treated gelations of Nos. 4, 8, 11 and 21 exhibited granules adhering to each others in water and substantial parts of the gelatins were not dissolved after 30 minutes. The control gelatin (30 Bloom) was completely dissolved at concentrations of 2, 4 and 6% in about 30 minutes, but the solutions obtained were not clear. Another raw gelatin (250 Bloom) was completely dissolved at concentrations of 2 and 4% in about 60 minutes to give clear solutions. No measurement was made at a concentration of 6%.

(3) In the case of stepwise addition of the whole amount divided into fractions, the gelatins of Nos. 1–3 were not completely dissolved after 30 minutes as in the case of adding the whole amount at once. The gelatins of Nos. 4, 8 and 11 were almost completely dissolved at concentrations of 2, 4 and 6% to give clear solutions. The gelatin of No. 21 gave almost same result, but not measured at a concentration of 6%. The raw gelatin (30 Bloom) corresponding to the treated gelatins of Nos. 4, 8 and 11 was dissolved completely at concentrations of 2, 4 and 6% in about 30 minutes to give unclear solutions.

(4) The above data indicate the advantages of stepwise addition of the treated gelatin, for example, at 20°–30° C. in 5–10 minutes with agitation.

Experiment VI (1) An alkali gelatin (granules; jelly strength 100 Bloom; weight 60 g including water content of 13%) was added to water at 20° C., and the swelled gelatin was heated to 50°–55° C. for 5 minutes. From the solution thus-obtained, a jelly (jelly strength 80 g; concentration 6%) was prepared. The jelly (500 g) was put in a vessel (15 liter) made of glass. The vessel was covered with a plate made of polytetrafluoroethylene (thickness 0.1 mm) and put in a microwave oven (output 2.2 kW at 2450 MHz). After a contnuous irradiation for 240 seconds, intermittent irradiations (each for 15 seconds followed by an interval for 30 seconds) were repeated to given an irradiation time of 360 seconds in total. The gelatin thus-treated was powdered (not more than 80 mesh) to give a sample of the treated gelatin (water content 0.7%; yield 25 g), the physical properties thereof being shown in Table 5.

(2) Separately, sodium bicarbonate (1.5% by weight of raw gelatin on dry basis) was added to the raw gelatin (60 g), from which another jelly (concentration 6%) was prepared in a similar manner to that described above. The jelly prepared was also treated with microwave in a similar manner to that described above to give another sample of the treated gelatin which was then powdered (not more than 80 mesh).

(3) The same raw gelatin was used to give a gelatin solution (2%) which was frozen at −20° C. and dried at −30° C. The freeze-dried gelatin prepared was powdered (not more than 80 mesh) to obtain a comparative gelatin.

(4) The thus-prepared two types of gelatins treated by the process of the present invention were tested by using jellies prepared in the following manner, the corn grade of the powders of the treated gelatins being elected to be not more than 250 mesh:

(A) The following materials (indicated by part by weight) were throughly mixed together.

| Gelatin | 2 |
|---|---|
| Sugar (powdered) | 20 |
| Sodium citrate | 1 |
| Citric acid | 0.5 |
| Flesh of pine apple (freeze-dried and powdered) | 0.5 |
| Enchi yellow (vitamin B1, commercial product of Tanabe Seiyaku K.K., Japan) | 0.01 |
| Pine apple flavour, artificial | 0.4 |

(B) When water (100 ml) was added to the mixture (25 g) with agitation, the materials other than gelatin were easily dissolved in water, and the treated gelatins were completely dissolved in about 4 minutes. When the gelatin solution was put in a jelly cup and allowed to stand at about 5° C. for 20 minutes, a jelly was formed. A comparative jelly was also formed by using the freeze-dried gelatin in a similar manner to that described above. In order to obtain another comparative jelly, a mixture using the raw gelatin was prepared and water was added to this mixture in a similar manner to that described above. After this, the raw gelatin was completely dissolved when the solution was heated to about 55° C. and the solution was cooled to room temperature. A jelly was formed in a similar manner to that described above.

(C) There were thus obtained four jellies respectively using the treated gelatin with addition of an expanding agent, the treated gelatin without addition of the expanding agent, the freeze-dried gelatin and the raw gelatin. These jellies had same taste and same appetizing feeling. However, with respect to the outlook and transparency, the jelly using the treated gelatin without addition of the expanding agent was inferior to other three jellies.

In the following tables, jellies 1, 2, 3 and 4 denote those prepared by using the treated gelatin without addition of sodium bicarbonate, the raw gelatin, the treated gelatin with addition of sodium bicarbonate and the freeze-dried gelatin, respectively, and the figures indicate the presons who evaluated the tested jelly to be superior. These tests were made by using a panel consisting of 20 persons in Tsuchiura Mill of Kyowa Hakko Kogyo K.K., and the significance was determined with a risk of 1%.

TABLE (A)

|  | Jelly 1 | Jelly 2 |
|---|---|---|
| Outlook | 3 | 17 |
| Taste | 11 | 9 |
| Appetizing attraction | 9 | 11 |

TABLE (B)

|  | Jelly 2 | Jelly 3 |
| --- | --- | --- |
| Outlook | 9 | 11 |
| Taste | 10 | 10 |
| Appetizing attraction | 9 | 11 |

TABLE (C)

|  | Jelly 2 | Jelly 4 |
| --- | --- | --- |
| Outlook | 10 | 10 |
| Taste | 11 | 9 |
| Appetizing attraction | 10 | 10 |

(5) Foaming ability and viscosity shown in Table 5 were determined in the following manner.

(A) Foaming ability:

A treated gelatin (1 g) in the form of powder (not more than 80 mesh) and powdered sugar (12 g) were put in a beaker and throughly mixed together. Water (40 ml) was added to the mixture with agitation at 20° C. to give a solution. A Kennwood mixer with a whipper (commercial product of Kennwood Inc. U.S.A.) was used for agitation. A millet jelly (148 g; solid content 75 g) and the mixture were combined and stirred for 10 minutes with a highest speed for foaming. A given volume of the solution was put in a measure cup and weighed. Foaming ability was determined by the following formula:

$$\text{Foaming ability} = \frac{\text{weight (g) before foaming}}{\text{weight (g) after foaming}}$$

(B) Viscosity:

A treated gelatin (10 g) in the form of powder (not more than 80 mesh) and powdered sugar (30 g) were put in a 1,000 ml beaker and throughly mixed together by using a spoon. Water (500 ml; 20° C.) was added to the mixture with stirring to make a uniform solution. Its viscosity was determined by using B-type viscometer [B1 type viscometer, commercial product of Tokyo Keiki K.K., Japan] with No. 1 rotor. After the viscometer was put in rotation for 3 minutes (60 r.p.m.), the viscosity was measured. A comparison with the freeze-dried gelatin described in U.S. Pat. No. 3,514,518 was tried, but no good result was not obtained by the gelatin prepared by this patented process.

The following non-limitative examples further illustrate the invention.

EXAMPLE 1

An alkali gelatin in the form of plate (weight 200 g, water content 15%, jelly strength 250 Bloom) was wrapped with kraft paper and enclosed in a glass wool (thickness 10 mm). The gelatin was heated for 210 seconds in an electron oven (pntput 400 W at 2450 MHz) and was then powdered (not more than 80 mesh). The thus-obtained gelatin (89 g, water content 4.3%) had the properties shown in Table 5.

EXAMPLE 2

An alkali gelatin in the form of a sheet (weight 200 g, water content 13%, jelly strength 100 Bloom) was treated in a similar manner to that described in Experiment No. 6 to give a jelly (weight 3 kg, jelly strength 100 g, concentration 6%) which was concentrated in vacuo (700 mmHg, 40° C.) to give a gelatin solution (concentration 25%). This solution was put in a vessel (length 25 cm × width 25 cm × height 32 cm, capacity 20 liters) made of polytetrafluoroethylene and heated for 540 seconds by using an electron oven (output 2.2 kW at 2450 MHz). The thus-obtained gelatin was powdered (not more than 80 mesh) and had the properties shown in Table 5 (water content 10.3%, weight 120 g).

EXAMPLE 3

Sugar (20 g) and guar gum (20 g) were dissolved in water (300 ml) with agitation for 20 minutes. To this solution was added an alkali gelatin in the form of granules having a corn grade of not more than 60 mesh (jelly strength 30 Bloom, water content 10%, weight 500 g). The mixture was throughly stirred to swell the gelatin. After this, the mixture was put in a vessel (20×20×25 cm, capacity 10 liters) made of polytetrafluoroethylene and heated for 240 seconds by using an electron oven (output 2.2 kW at 2450 MHz) to give a treated gelatin (water content 10%). This gelatin was dried with hot air at 45° C. for 10 minutes and then powdered (not more than 80 mesh). A mixture of the treated gelatin (450 g) in granular form was obtained. Its water-solubility was equal to that of a comparative gelatin prepared in a similar manner to that described above except without addition of sugar and guar gum. However, the viscosity of the gelatin according to this example was equal to the viscosity of the comparative gelatin to which was afterward added sugar and guar gum, followed by being dissolved.

Test Nos. 55 and 56 in Table 5 show the control gelatin prepared in a similar manner to that described above by subjecting the same raw gelatin to microwave heating without addition of sugar and guar gum. No. 63 shows the data on a gelatin prepared by subjecting a raw gelatin having a same Bloom to microwave heating, followed by addition of sugar and guar gum in the same amounts as those described in No. 63.

Separately, another treated gelatin was prepared in a similar manner to that described above with the exception that water (300 ml) was added with sodium bicarbonate (0.2% by dry weight of gelatin). Jellies were prepared from the thus-obtained two types of gelatin and were compared with each other quantatively to confirm that the outlook and transparency of the gelatin prepared by addition of sodium bicarbonate were superior to those of the gelatin prepared without addition of sodium carbinate.

EXAMPLE 4

An acid-treated gelatin (lump, water content 20%, jelly strength 150 Bloom, weight 100 g) was wrapped in a perforated sheet of polytetrafluoroethylene (thickness 0.1 mm) having many perforations (diameter 0.5–1 mm) and heated for 180 seconds by using an electron oven (output 2.2 kW at 2450 MHz) to give a treated gelatin which was then powdered to yield a gelatin powder (not more than 80 mesh, water content 7.0%, weight 55 g). Its properties are shown in Table 5 together with the properties of the gelatins of Experiments Nos. 3, 4 and 6 for comparison purpose.

TABLE 1

| (1) Test No. | (2) Initial water content (%) | (3) Treating time (sec) | (4) Water in treated gelatin (%) | (5) Dissolved amount (I) mg/ml | (6) Solubility Index (A) % | (7) Jelly strength (g) | (8) Solubility Index (B) % | (9) Expansion ratio (x)*** |
|---|---|---|---|---|---|---|---|---|
| 1 | 3.2 | 120 | 1.2 | 1.00 | 16.5 | * | — | |
| 2 | 5.6 | 120 | 2.3 | 1.45 | 23.9 | * | — | |
| 3 | 7.9 | 150 | 4.5 | 2.44 | 40.3 | * | — | 1.0 |
| 4 | 10.5 | 150 | 4.1 | 3.54 | 65.1 | 1.2 | 30.0 | 1.2 |
| 5 | 10.5 | 120 | 7.0 | 3.15 | 58.0 | ** | — | |
| 6 | 11.7 | 180 | 4.1 | 4.86 | 80.3 | 2.1 | 52.5 | |
| 7 | 11.7 | 150 | 6.5 | 4.50 | 75.1 | 1.7 | 45.8 | |
| 8 | 15.3 | 210 | 4.3 | 6.14 | 101.6 | 4.1 | 100 | 4 |
| 9 | 20.2 | 300 | 4.8 | 5.98 | 98.9 | 4.0 | 100 | |
| 10 | 34.3 | 380 | 4.4 | 5.88 | 97.2 | 3.9 | 97.5 | |
| 11 | 44.9 | 450 | 4.2 | 5.86 | 96.8 | 3.3 | 82.5 | 18 |
| 12 | 75.8 | 600 | 4.6 | 5.71 | 94.4 | 2.9 | 72.5 | |
| 13 | 90.2 | 720 | 4.0 | 5.57 | 92.0 | 2.7 | 67.5 | |
| 14 | 15.3 | — | — | 2.49 | 41.1 | * | — | |
| 15 | 15.3 | — | — | 6.05 | 100.0 | 4.0 | 100 | |

*Swelled and not solidified.
**Swelled and solidified.
***Approximate value.

TABLE 2

| (1) Test No. | (2) Initial water content (%) | (3) Treating time (sec) | (4) Water in treated gelatin (%) | (5) Dissolved amount (I) mg/ml | (6) Solubility Index (A) % | (7) Jelly strength (g) | (8) Solubility Index (B) % | (9) Expansion ratio (x)*** |
|---|---|---|---|---|---|---|---|---|
| 16 | 7.5 | 150 | 4.9 | 0.96 | 15.7 | * | — | |
| 17 | 12.0 | 180 | 5.2 | 1.88 | 30.7 | * | — | 1.2 |
| 18 | 16.5 | 210 | 5.9 | — | — | 69.5 | 92.7 | |
| 19 | 26.5 | 330 | 0.9 | — | — | 73.7 | 98.2 | |
| 20 | 26.5 | 270 | 3.2 | — | — | 74.5 | 99.3 | 20 |
| 21 | 26.5 | 135 | 10.0 | — | — | 74.7 | 99.6 | |
| 22 | 26.5 | 90 | 14.0 | — | — | 74.2 | 98.9 | |
| 23 | 50.2 | 540 | 4.3 | — | — | 74.3 | 99.0 | 19 |
| 24 | 50.2 | 450 | 10.2 | — | — | 74.8 | 99.7 | |
| 25 | 50.2 | 390 | 15.5 | — | — | 71.5 | 95.3 | |
| 26 | 50.2 | 330 | 20.3 | — | 13 | 58.5 | 78.0 | |
| 27 | 50.2 | 285 | 25.5 | — | — | 40.1 | 54.7 | |
| 28 | 50.2 | 225 | 30.0 | 2.14 | 35.0 | * | — | |
| 29 | 16.5 | — | — | 1.47 | 24.0 | * | — | |
| 30 | 16.5 | — | — | 6.12 | 100. | 75.0 | 100 | |

*Swelled and not solidified.
***Approximate value.

TABLE 3

| Test No. | Gel. conc. (%) | Dis. time (min) | 30° C. Jel. str. (g) | 30° C. Solu. index (B) | 20° C. Jel. str. (g) | 20° C. Solu. index (B) | 15° C. Jel. str. (g) | 15° C. Solu. index (B) | 10° C. Jel. str. (g) | 10° C. Solu. index (B) | 5° C. Jel. str. (g) | 5° C. Solu. index (B) |
|---|---|---|---|---|---|---|---|---|---|---|---|---|
| 31 | 0.5 | 1 | — | 99.5 | — | 97.0 | — | — | — | — | — | — |
| 32 | 1.0 | 3 | 3.5 | 100.0 | 3.7 | 100.0 | 1.5 | * | ** | *** | ** | *** |
| 33 | 2.0 | 2 | 11.5 | 92.0 | 10.5 | 84.0 | 15.5 | * | ** | *** | ** | *** |
| 34 | 2.0 | 3 | 12.7 | 100.0 | 12.0 | 96.0 | 13.5 | * | ** | *** | ** | *** |
| 35 | 2.0 | 5 | 12.4 | 99.2 | 12.5 | 100.0 | 14.1 | * | ** | *** | ** | *** |
| 36 | 2.0 | 10 | 12.5 | 100.0 | 12.6 | 100.0 | 16.6 | * | ** | *** | ** | *** |
| 37 | 4.0 | 3 | 75.2 | 100.0 | 75.5 | 100.0 | 82.5 | * | 25 | *** | ** | *** |
| 38 | 0.5 | — | — | — | — | — | — | — | — | — | — | — |
| 39 | 1.0 | — | — | — | 3.5 | — | — | — | — | — | — | — |
| 40 | 2.0 | — | — | — | 12.5 | — | — | — | — | — | — | — |
| 41 | 4.0 | — | — | — | 75.0 | — | — | — | — | — | — | — |

[Notes]
Gel. conc. = Gelatin concentration:
Dis. time = Dissolving time:
Jel. str. = Jelly strength:
Solu. index (B) = Solubility index (B):
* = Contained some swelled fractions:
** = Not jellified:
*** = Swelled.

TABLE 4

| Test No. | Gel. conc. (%) | Dis. time (min) | 30° C. Jel. str. (g) | 30° C. Solu. index (B) | 20° C. Jel. str. (g) | 20° C. Solu. index (B) | 15° C. Jel. str. (g) | 15° C. Solu. index (B) | 10° C. Jel. str. (g) | 10° C. Solu. index (B) | 5° C. Jel. str. (g) | 5° C. Solu. index (B) |
|---|---|---|---|---|---|---|---|---|---|---|---|---|
| 42 | 0.5 | 1 | — | 99.7 | — | 96.5 | — | — | — | — | — | — |
| 43 | 2.0 | 3 | ** | **** | ** | **** | ** | **** | ** | * | ** | ***** |
| 44 | 4.0 | 2 | 3.0 | 75.0 | 3.0 | 75.0 | 3.0 | 75.0 | 7.2 | * | ** | ***** |
| 45 | 4.0 | 3 | 3.8 | 95.0 | 4.2 | 100.0 | 3.8 | 95.0 | 6.7 | * | ** | ***** |
| 46 | 4.0 | 5 | 4.0 | 100.0 | 4.0 | 100.0 | 4.2 | 100.0 | 3.8 | 95.0 | ** | ***** |
| 47 | 4.0 | 10 | 4.0 | 100.0 | 4.0 | 100.0 | 4.0 | 100.0 | 4.0 | 100.0 | ** | ***** |
| 48 | 6.0 | 3 | 15.5 | 100.0 | 14.9 | 99.3 | 13.5 | 90.0 | 21.6 | * | 1.0 | ***** |
| 49 | 0.5 | — | — | — | — | — | — | — | — | — | — | — |
| 50 | 2.0 | — | — | — | 1.5 | — | — | — | — | — | — | — |
| 51 | 4.0 | — | — | — | 4.0 | — | — | — | — | — | — | — |
| 52 | 6.0 | — | — | — | 15.0 | — | — | — | — | — | — | — |

[Notes] See Table 3.
**** = Completely dissolved:
***** = Contained many swelled fractions.

TABLE 5

| Test No. | Sample of gelatin prepared in Example (or Experiment) No. | Water-solubility Solu. index (A) | Water-solubility Jelly strength (g) | Water-solubility Solu. index (B) | Foaming ability (20° C.; 0.5%) | Viscosity (cps) (20° C.; 2%) |
|---|---|---|---|---|---|---|
| 53 | Experiment 3 | — | 75.5 | 100 | 375 | 61.5 |
| 54 | Experiment 3 (control) | — | 75.0 | 100 | 149 | 8.6 |
| 55 | Experiment 4 | 99.5 | 4.2 | 100 | 556 | 6.6 |
| 56 | Experiment 4 (control) | 100.0 | 4.0 | 100 | 338 | 6.5 |
| 57 | Example 1 | — | 79.6 | 99.1 | 360 | 67.7 |
| 58 | Example 1 (control) | — | 80.3 | 100 | 150 | 8.9 |
| 59 | Experiment 6* | — | 22.0 | 100 | 451 | 40.8 |
| 60 | Experiment 6 (control) | — | 21.6 | 100 | 240 | 7.2 |
| 61 | Example 2 | — | 33.0 | 99.4 | 420 | 47.5 |
| 62 | Example 2 (control) | — | 33.2 | 100 | 185 | 7.7 |
| 63 | Example 3 | 100.1 | 3.8 | 95.0 | 585 | 58.0 |
| 64 | Example 3 (control) | 100 | 4.0 | 100 | 350 | 57.8 |
| 65 | Example 4 | — | 35.0 | 96.7 | 393 | 50.2 |
| 66 | Example 4 (control) | — | 36.2 | 100 | 170 | 8.0 |

[Note]
* = Not added with sodium bicarbonate.

What we claim is:

1. A process for improving the cold water-solubility of gelatin, which comprises subjecting a gelatin having a water content of more than 8% by weight to microwave heating to remove at least 35% of said water content so as to obtain a treated gelatin having a water content of not more than 16% by weight.

2. The process of claim 1 wherein the water content of the said gelatin is from 10 to 55% by weight.

3. The process of claim 1 wherein the water content of the gelatin prior to microwave heating is more than 16% by weight.

4. The process of claim 1 wherein the water content of the gelatin prior to microwave heating is from 10 to 13% by weight.

5. The process of claim 1 wherein the microwave heating is effected so that the water content of the treated gelatin is at least 5% by weight.

6. The process of claim 1 wherein the treated gelatin is in powder form having a particle size no greater than 80 meshes.

7. A process for improving the cold water-solubility of gelatin, which comprises subjecting a gelatin having a water content of more than 8% by weight, in association with an edible dispersing agent to microwave heating to obtain a treated gelatin having a water content of not more than 16% by weight.

8. The process of claim 7 wherein the amount of the dispersing agent used is from 3 to 20% by weight of the gelatin on dry basis.

9. A process for improving the cold water-solubility of gelatin, which comprises subjecting a gelatin having a water content of more than 8% by weight in association with an expanding agent to microwave heating to remove at least 35% of said water content so as to obtain a treated gelatin having a water content of not more than 16% by weight.

10. The process of claim 9 wherein the expanding agent is at least one member selected from the class consisting of sodium hydrogen carbonate and ammonium hydrogen carbonate.

11. The process of claim 9 wherein the amount of the expanding agent used is from 0.1 to 5% by weight of the gelatin used on dry basis.

12. The process of claim 1 wherein the temperature of the gelatin is raised to 80° to 150° C. during the microwave heating.

13. The process of claim 1 wherein the gelatin during the microwave heating is enclosed with a microwave-permeable material.

14. The process of claim 13 wherein the microwave-permeable material is at least one member selected from the class consisting of polytetrafluoroethylene, glass wool and kraft paper.

15. The process of claim 1 wherein 7 wherein the edible dispersing agent is present during the microwave heating.

16. The process of claim 15 wherein the dispersing agent is at least one member selected from the class consisting of a sweatening agent, sugar and glucose.

17. The process of claim 15 wherein the dispersing agent is a taste-enhancing agent.

* * * * *